US009274733B2

(12) United States Patent
Shiraga et al.

(10) Patent No.: US 9,274,733 B2
(45) Date of Patent: Mar. 1, 2016

(54) TERMINAL DEVICE AND PRINTER CAPABLE OF USING PRINT INTERMEDIATION SERVER IN WHICH PRINTER RELATED INFORMATION INCLUDING PRINT CONDITION INFORMATION IS REGISTERED

(71) Applicant: Brother Kogyo Kabushiki Kaisha, Nagoya-shi, Aichi-ken (JP)

(72) Inventors: Naoto Shiraga, Nagoya (JP); Fumio Okumura, Nagoya (JP); Takanobu Suzuki, Nagoya (JP); Takeshi Miyake, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/447,665

(22) Filed: Jul. 31, 2014

(65) Prior Publication Data
US 2015/0036189 A1 Feb. 5, 2015

(30) Foreign Application Priority Data
Jul. 31, 2013 (JP) ................................. 2013-159536

(51) Int. Cl.
*G06F 3/12* (2006.01)
(52) U.S. Cl.
CPC ............ *G06F 3/1288* (2013.01); *G06F 3/1204* (2013.01); *G06F 3/1224* (2013.01); *G06F 3/1292* (2013.01); *G06F 3/1222* (2013.01); *G06F 3/1238* (2013.01)
(58) Field of Classification Search
None
See application file for complete search history.

(56) References Cited

U.S. PATENT DOCUMENTS

| 8,749,823 | B2 | 6/2014 | Kato |
| 2003/0005050 | A1 | 1/2003 | Pineau et al. |
| 2003/0231339 | A1* | 12/2003 | Makishima et al. ......... 358/1.15 |
| 2005/0002058 | A1 | 1/2005 | Hirabayashi |

(Continued)

FOREIGN PATENT DOCUMENTS

| CN | 101321226 A | 12/2008 |
| CN | 102356627 A | 2/2012 |

(Continued)

OTHER PUBLICATIONS

Machine translation of JP Pub 2009-070240. Osumi Junichi; "System and method for obtaining document data from document management server"; JP Pub date Sep. 14, 2007.*

(Continued)

*Primary Examiner* — Benny Q Tieu
*Assistant Examiner* — Haris Sabah
(74) *Attorney, Agent, or Firm* — Banner & Witcoff, Ltd.

(57) ABSTRACT

A terminal device may register printer related information including virtual print condition information indicating a virtual print condition in a print intermediation server, obtain authentication information from the print intermediation server, receive print condition related information being related to an actual print condition from an actual printer after the printer related information was registered in the print intermediation server, and changing, by using the authentication information and the print condition related information, contents of the printer related information being registered in the print intermediation server, from a state including the virtual print condition information to a state including actual print condition information indicating the actual print condition.

9 Claims, 7 Drawing Sheets

(56) References Cited

U.S. PATENT DOCUMENTS

| | | |
|---|---|---|
| 2008/0304088 A1 | 12/2008 | Tomihisa |
| 2009/0036056 A1 | 2/2009 | Oshima et al. |
| 2010/0091321 A1 | 4/2010 | LeVier et al. |
| 2011/0242569 A1 | 10/2011 | Ohara |
| 2011/0242599 A1 | 10/2011 | Ohara |
| 2011/0292445 A1 | 12/2011 | Kato |
| 2012/0162681 A1 | 6/2012 | Tomita |
| 2013/0070288 A1 | 3/2013 | Muranaka |
| 2013/0077125 A1 | 3/2013 | Kitagata |
| 2013/0114107 A1 | 5/2013 | Park |
| 2013/0286425 A1 | 10/2013 | Nakamura et al. |
| 2014/0342665 A1 | 11/2014 | Amano |
| 2014/0368859 A1 | 12/2014 | Gutnik et al. |

FOREIGN PATENT DOCUMENTS

| | | |
|---|---|---|
| JP | 2003-280832 A | 10/2003 |
| JP | 2008-040963 A | 2/2008 |
| JP | 2009-070240 A | 4/2009 |
| JP | 2013-073314 A | 4/2013 |
| WO | 2010107125 A1 | 9/2010 |

OTHER PUBLICATIONS

Oct. 27, 2014—(EP) Extended European Search Report—App 14173971.4.

"What is Google Cloud Print", online, Jun. 25, 2013, <URL: http://developers.google.com/cloud-print/> and <URL: http://developers.google.com/cloud-print/docs/overview>.

Co-pending U.S. Appl. No. 14/317,000, filed Jun. 27, 2014.

Aug. 13, 2015—(US) Non-Final Office Action—U.S. Appl. No. 14/317,000.

Aug. 6, 2015—(CN) Notification of First Office Action—App 201410301816.8.

Dec. 16, 2015—(US) Final Office Action—U.S. Appl. No. 14/317,000.

* cited by examiner

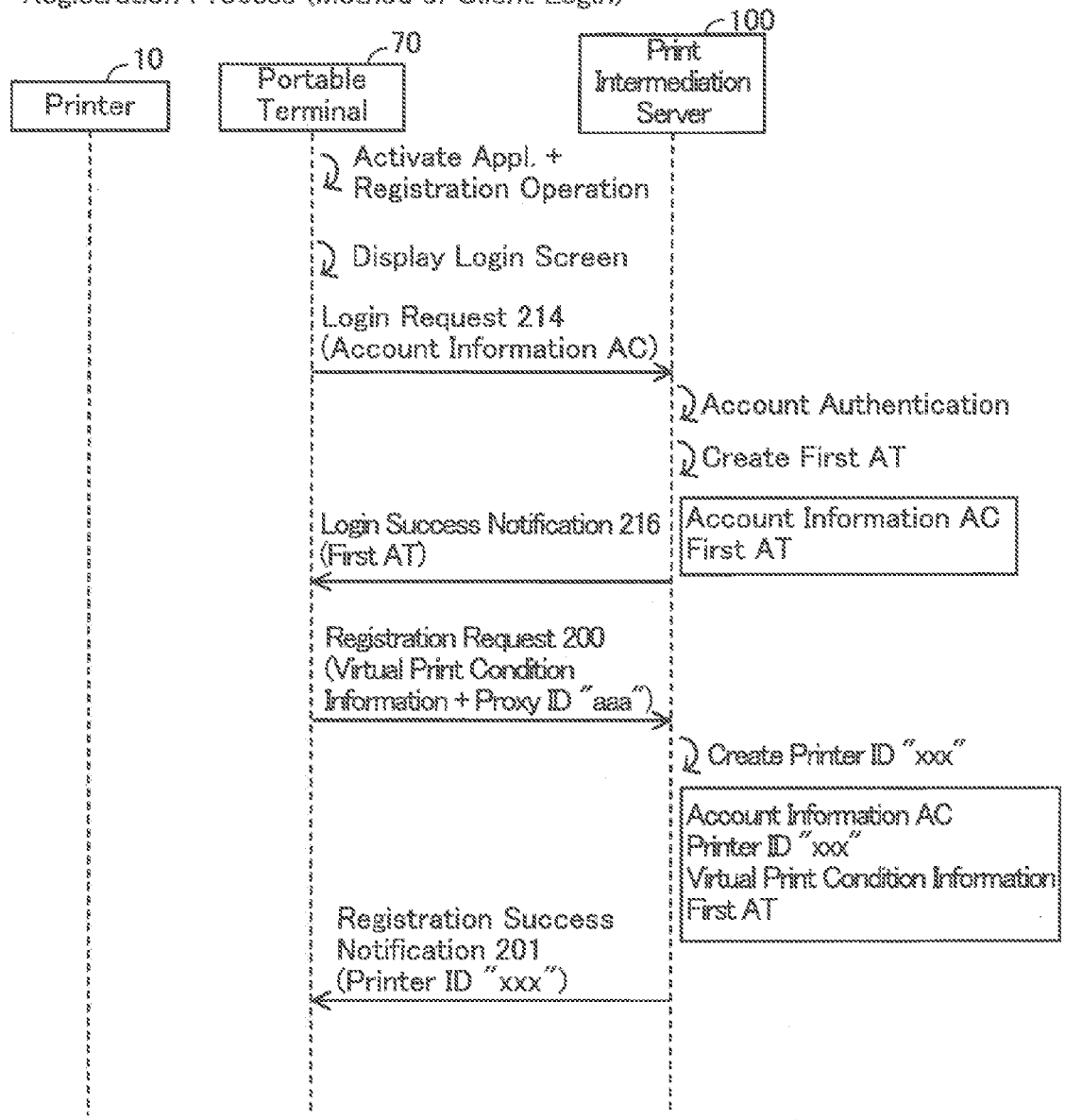

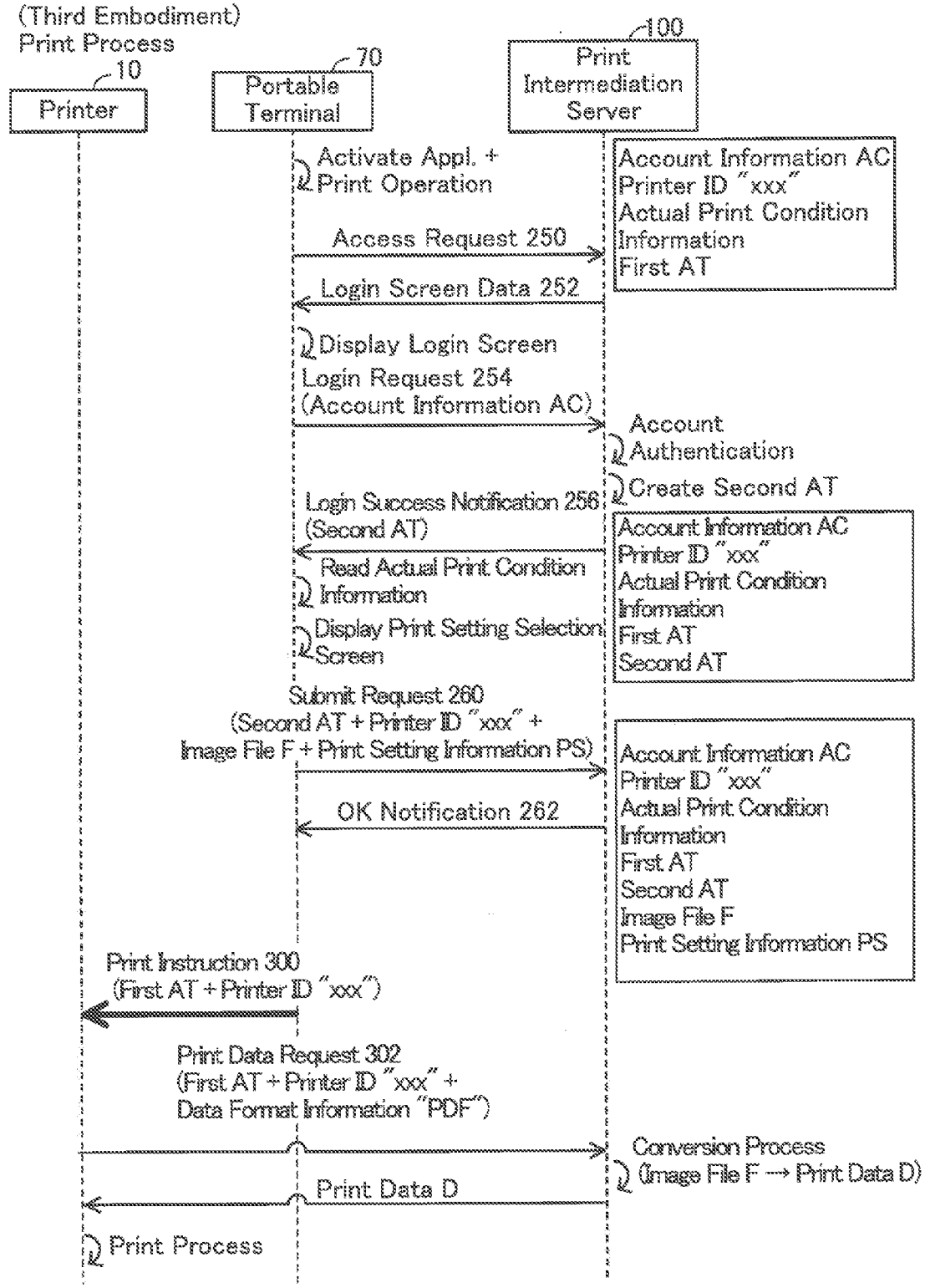

US 9,274,733 B2

TERMINAL DEVICE AND PRINTER CAPABLE OF USING PRINT INTERMEDIATION SERVER IN WHICH PRINTER RELATED INFORMATION INCLUDING PRINT CONDITION INFORMATION IS REGISTERED

CROSS-REFERENCE TO RELATED APPLICATIONS

This application claims priority to Japanese Patent Application No. 2013-159536, filed on Jul. 31, 2013, the contents of which are hereby incorporated by reference into the present application.

TECHNICAL FIELD

The present specification discloses a technique in which a terminal device causes a printer to perform a print using a print intermediation server.

DESCRIPTION OF RELATED ART

A technique of causing a printer to perform a print, by sending data from a terminal device to a server, and receiving at the printer the data from the server is known. For example, a service on the Internet called Google (registered trademark) Cloud Print (referred to as "GCP" below) is known. For example, a user accesses a printer by using a terminal device, and causes the printer to perform a communication with a server which provides the GCP (referred to as a "GCP server" below). By this means, the printer can register printer related information being related to the printer in the GCP server. The printer related information includes actual print condition information indicating an actual print condition (e.g., paper size, number of colors etc.) which is capable of being used actually in the printer. Consequently, an XMPP (abbreviation of eXtensible Messaging and Presence Protocol) connection is established between the printer and the GCP server. Subsequently, when an image file which represents an image of a print target is to be submitted to the GCP server, the terminal device obtains the actual print condition information from the GCP server, and displays a print setting selection screen for causing the user to select a print setting from the actual print condition. Then, the terminal device submits to the GCP server the image file and print setting information indicating the print setting selected by the user. In this case, by using the XMPP connection, the GCP server supplies a submit notification to the printer. When obtaining the submit notification from the GCP server, the printer obtains from the GCP server print data created from the image file in accordance with the print setting, and performs a print of an image represented by the print data.

SUMMARY

According to the above technique, the user needs to cause the printer to perform a communication with the server to register the printer related information in the server. The present specification provides a technique that may improve a user convenience.

A terminal device may comprise a processor; and a memory storing computer-readable instructions therein. The computer-readable instructions, when executed by the processor, may cause the terminal device to perform: registering printer related information in a print intermediation server, the printer related information including virtual print condition information indicating a virtual print condition, the virtual print condition being a print condition which is capable of being used virtually in a virtual printer; obtaining authentication information from the print intermediation server, the authentication information being to be registered in the print intermediation server in association with the printer related information; receiving print condition related information from an actual printer after the printer related information was registered in the print intermediation server, the print condition related information being related to an actual print condition, the actual print condition being a print condition which is capable of being used actually in the actual printer; and changing, by using the authentication information and the print condition related information, contents of the printer related information being registered in the print intermediation server, from a state including the virtual print condition information to a state including actual print condition information indicating the actual print condition.

A printer may comprise: a print performing unit; a processor; and a memory storing computer-readable instructions therein. The computer-readable instructions, when executed by the processor, may cause the printer to perform: receiving authentication information from a terminal device after the authentication information and printer related information were registered in association in a print intermediation server by the terminal device, the printer related information including virtual print condition information indicating a virtual print condition, the virtual print condition being a print condition which is capable of being used virtually in a virtual printer; establishing a specific connection with the print intermediation server by using the authentication information; sending, to the terminal device, print condition related information related to an actual print condition, the actual print condition being a print condition which is capable of being used actually in the printer, the print condition related information being used by the terminal device to change contents of the printer related information being registered in the print intermediation server from a state including the virtual print condition information to a state including actual print condition information indicating the actual print condition; obtaining, from the print intermediation server by using the specific connection, a notification indicating that file related information and print setting information were registered in the print intermediation server, in a case where the file related information and the print setting information are registered in the print intermediation server in association with the authentication information and the printer related information by the terminal device, the file related information being related to a target file which represents an image of a print target, the print setting information indicating a print setting selected from among the actual print condition by a user of the terminal device; obtaining, from the print intermediation server, print data created from the target file in accordance with the print setting in a case where the notification is obtained; and controlling the print performing unit to perform a print by using the print data.

A control method, computer-readable instructions, and a non-transitory computer-readable medium storing the computer-readable instructions, for achieving any one of the above devices (that is, the terminal device or the printer), are also new and useful. Further, a communication system which has the above terminal device and printer (i.e. the actual printer) is also new and useful.

BRIEF DESCRIPTION OF THE DRAWINGS

FIG. 6 illustrates a sequence diagram of a registration process according to a second embodiment; and FIG. 7 illustrates a sequence diagram of a print process according to a third embodiment.

EMBODIMENT (First Embodiment)

Figure 1:
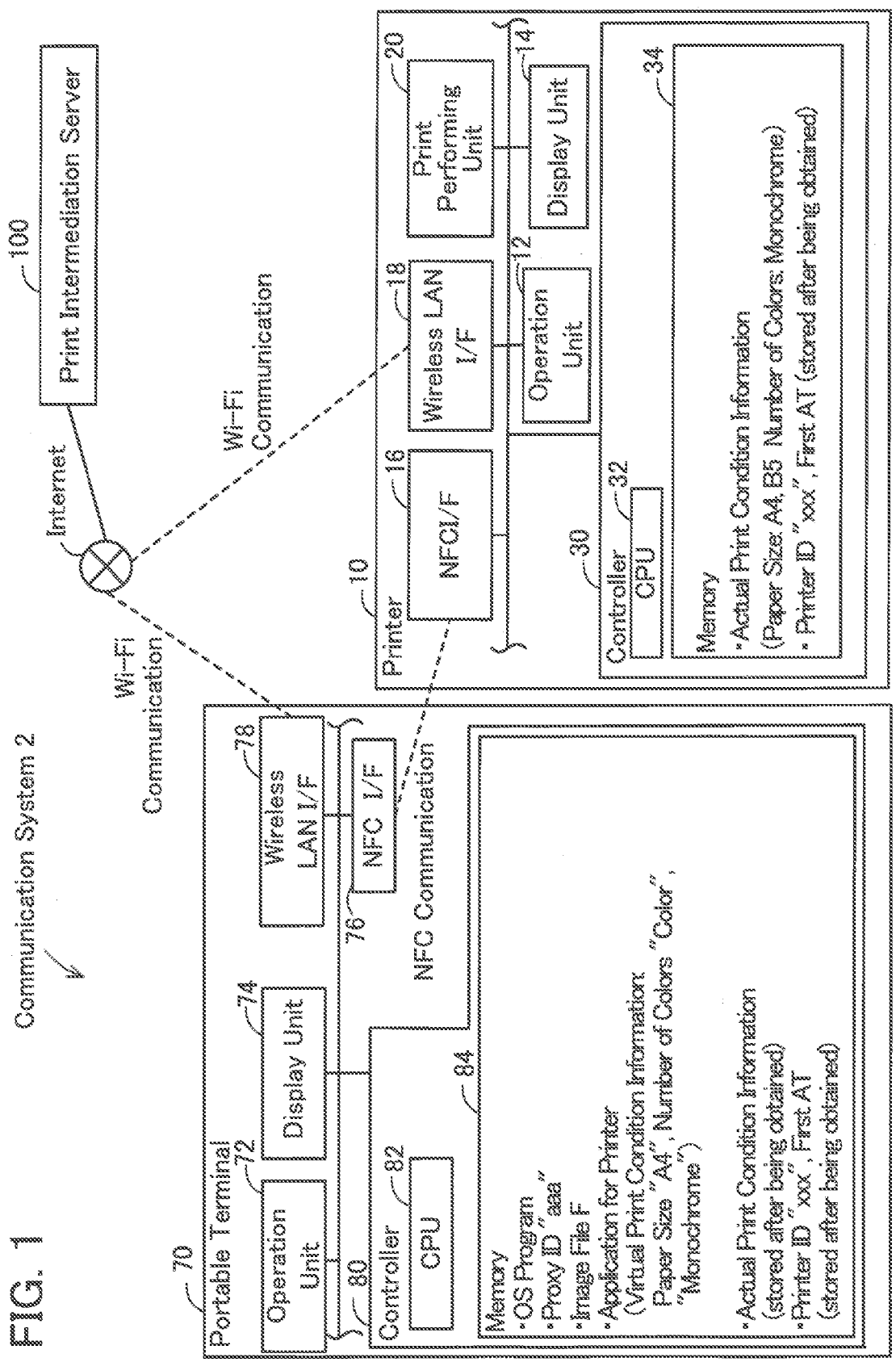
FIG. 1 illustrates a configuration of a communication system.

As illustrated in FIG. 1, a communication system 2 has a printer 10, a portable terminal 70 and a print intermediation server 100. Each of the devices 10, 70 and 100 can perform a communication with each other via the Internet.

(Configuration of Printer 10)

The printer 10 is a peripheral apparatus (i.e. peripheral apparatus of a PC or the like) which can perform a printing function. The printer 10 comprises an operation unit 12, a display unit 14, an NFC (abbreviation of Near Field Communication) interface 16, a wireless LAN (abbreviation of Local Area Network) interface 18, a print performing unit 20, and a controller 30. Each of the units 12 to 30 is connected to a bus line (a reference numeral is not illustrated). Hereinafter, the interface will be described as an "I/F".

The operation unit 12 comprises a plurality of keys. A user can give various instructions to the printer 10 by operating the operation unit 12. The display unit 14 is a display for displaying various pieces of information. The print performing unit 20 is a printing mechanism such as an ink jet printing or a laser printing.

The NFC I/F 16 is an I/F (i.e. an IC chip or a communication circuit) for performing a wireless communication in accordance with an NFC scheme for a so-called short distance wireless communication (referred to as an "NFC communication" below). The NFC scheme, for example, is a wireless communication scheme based on an international standard of ISO/IEC21481 or 18092.

The wireless LAN I/F 18 is an I/F (i.e. an IC chip or a communication circuit) for performing a wireless communication in accordance with the Wi-Fi scheme defined by the Wi-Fi Alliance (referred to as a "Wi-Fi communication" below). The Wi-Fi scheme, for example, is a wireless communication scheme based on the standard of 802.11 of IEEE (abbreviation of The Institute of Electrical and Electronics Engineers, Inc.) and a standard (e.g. 802.11a, 11b, 11g or 11n) equivalent to this standard. The wireless LAN I/F 18 may be an I/F for performing a wireless communication via an access point (e.g. a wireless communication of an infrastructure scheme), or may be an I/F for performing a wireless communication not via an access point (e.g. a wireless communication of an ad-hoc scheme or a Wi-Fi Direct scheme).

Here, a difference between the NFC I/F 16 and the wireless LAN I/F 18 will be described. A communication speed (e.g. a maximum communication speed is 11 to 600 Mbps) of a wireless communication via the wireless LAN I/F 18 is faster than a communication speed (e.g. a maximum communication speed is 100 to 424 Kbps) of a wireless communication via the NFC I/F 16. Further, a frequency of a carrier wave (e.g. a 2.4 GHz band or a 5.0 GHz band) upon a wireless communication via the wireless LAN I/F 18 is different from a frequency of a carrier wave (e.g. a 13.56 MHz band) upon a wireless communication via the NFC I/F 16. Furthermore, for example, when a distance between the NFC I/F 16 of the printer 10 and an NFC I/F of another apparatus (e.g. the portable terminal 70) is about 10 cm or less, the controller 30 can perform an NFC communication with said apparatus via the NFC I/F 16. However, a distance between the NFC I/F 16 of the printer 10 and an NFC I/F of another apparatus is more than 10 cm, the controller 30 can not perform an NFC communication with said apparatus via the NFC I/F 16. Meanwhile, even when a distance between the wireless LAN I/F 18 of the printer 10 and the wireless LAN I/F of another apparatus (e.g. the portable terminal 70, an access point) is 10 cm or less or 10 cm or more (e.g. about 100 m at maximum), the controller 30 can perform a Wi-Fi communication with the apparatus via the wireless LAN I/F 18. That is, a maximum distance at which the printer 10 can perform a wireless communication with another apparatus via the wireless LAN I/F 18 is longer than a maximum distance at which the printer 10 can perform a wireless communication with another apparatus via the NFC I/F 16.

The controller 30 comprises a CPU 32 and a memory 34. The CPU 32 is a processor which performs various processes in accordance with a program stored in the memory 34. The memory 34 is configured by a RAM, a ROM and the like.

The memory 34 further stores actual print condition information. The actual print condition information indicates an actual print condition which is capable of being used actually in the printer 10. The actual print condition information includes sheet size information indicating sizes of print sheets, and number of colors information indicating number of colors. The sheet size information included in the actual print condition information indicates "A4" and "B5". The number of colors information included in the actual print condition information indicates "monochrome print". Moreover, the actual print condition information may further include other information indicating whether it is capable of duplex printing, page orientation (e.g., landscape print, portrait print) etc.

When a printer ID "xxx" and first AT (abbreviation of Authentication (or Access) Token) are obtained from the portable terminal 70, the memory 34 further stores the printer ID "xxx" and the first AT. The printer ID "xxx" is ID registered in the print intermediation server 100 for identifying the printer, and is created by the print intermediation server 100. The first AT is authentication information for the print intermediation server 100 to perform authentication, and is created by the print intermediation server 100.

(Configuration of Portable Terminal 70)

The portable terminal 70 is a portable terminal device such as a mobile telephone (e.g. a smartphone), a PDA, a notebook PC, a tablet PC, a portable music playback device or a mobile movie playback device. The portable terminal 70 comprises an operation unit 72, a display unit 74, an NFC I/F 76, a wireless LAN I/F 78 and a controller 80. Each of the units 72 to 80 is connected to a bus line (a reference numeral is not illustrated).

The operation unit 72 comprises a plurality of keys. A user can give various instructions to the portable terminal 70 by operating the operation unit 72. The display unit 74 is a display for displaying various pieces of information. The NFC I/F 76 and the wireless LAN I/F 78 are the same as the NFC I/F 16 and the wireless LAN I/F 18 of the printer 10, respectively. Hence, the difference between the NFC I/F 76 and the wireless LAN I/F 78 is the same as the difference between the NFC I/F 16 and the wireless LAN I/F 18.

The controller 80 comprises a CPU 82 and a memory 84. The CPU 82 is a processor which performs various processes in accordance with an OS program stored in the memory 84. The memory 84 is configured by a RAM, a ROM and the like. The memory 84 stores further stores a proxy ID for identifying the portable terminal 70, an image file F, and an application for printer (referred to as a "printer appl." below).

The image file F is a file which represents an image captured by, e.g., the portable terminal 70. The image file F may be a file in any file format, e.g., may be a file in bitmap format such as JPEG (abbreviation of Joint Photographic Experts Group), may be a file in vector format, or may be a file in text format.

The printer appl. is an application for causing the printer 10 to perform a print by using the print intermediation server 100. The printer appl. is an application provided by a vendor of the printer 10. The printer appl. may be installed to the portable terminal 70 from a server on the Internet, or may be installed to the portable terminal 70 from a medium shipped together with the printer 10.

The printer appl. includes virtual print condition information indicating a virtual print condition which is capable of being used virtually in a virtual printer, not an actual printer (e.g., the printer 10). The virtual print condition information indicates a print condition determined in advance by the vendor of the printer 10, and includes sheet size information and number of colors information. The sheet size information included in the virtual print condition information indicates "A4". The number of colors information included in the virtual print condition information indicates "color print" and "monochrome print". Consequently, the virtual print condition indicated by the virtual print condition information is different from the actual print condition of the printer 10.

When the actual print condition information is obtained from the printer 10, the memory 84 further stores the actual print condition information. When the printer ID "xxx" and the first AT are obtained from the print intermediation server 100, the memory 84 further stores the printer ID "xxx" and the first AT.

(Configuration of Print Intermediation Server 100)

The print intermediation server 100 is a server which is located on the Internet, and is, for example, a GCP server provided by Google (registered trademark). In this regard, in modified embodiments, the print intermediation server 100 may be a server provided by the vendor of the printer 10 or may be a server provided by a business operator different from the vendor of the printer 10.

The print intermediation server 100 is a server for performing an intermediation of a print between an external apparatus (e.g. the portable terminal 70) and a printer (e.g. the printer 10). That is, the print intermediation server 100 converts image file submitted from the external apparatus, creates print data in a data format which can be interpreted by the printer, and supplies the print data to the printer. Therefore, even when the external apparatus does not comprise a printer driver for converting the image data into the print data, the external apparatus can cause the printer to perform a print by submitting the image file to the print intermediation server 100.

(Advance Preparation)

The user of the portable terminal 70 performs the following advance preparation in order to cause the printer 10 to perform a print via the print intermediation server 100.

That is, the user of the portable terminal 70 registers account information AC in the print intermediation server 100 by using, for example, the portable terminal 70. The account information AC includes, for example, a user ID, a password and the like. It should be noted that, the user may register the account information AC in the print intermediation server 100 by using another apparatus (e.g. a PC) instead of using the portable terminal 70. When the account information AC of the user is registered in the print intermediation server 100, the user can cause the printer 10 to perform a print by using the print intermediation server 100.

Figure 2:
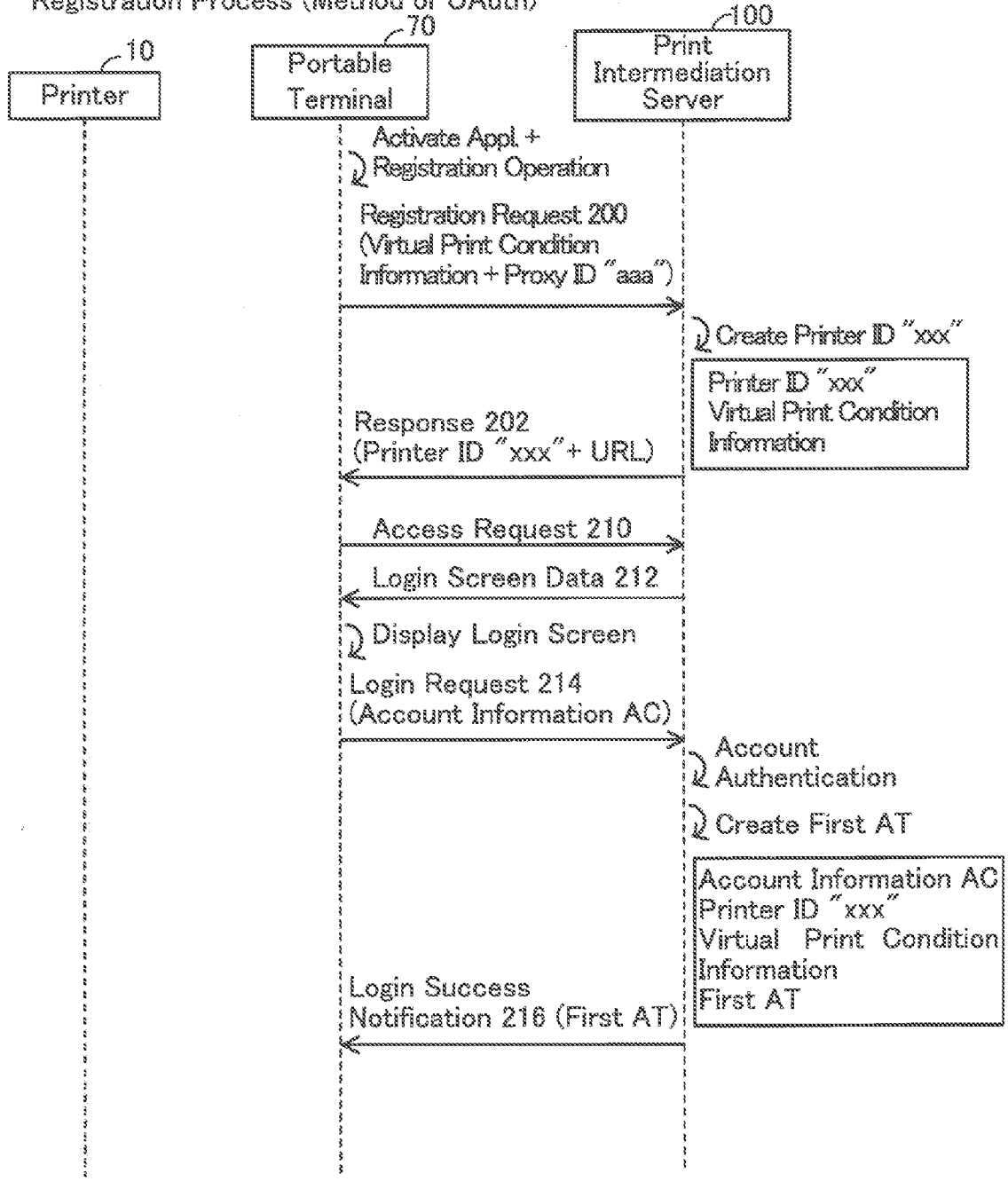
FIG. 2 illustrates a sequence diagram of a registration process.

(Registration Process; FIG. 2)

Subsequently, a registration process for the portable terminal 70 to register various pieces of information in the print intermediation server 100 will be described with reference to FIG. 2. In the present embodiment, the registration process using OAuth is performed.

In the registration process, the user of the portable terminal 70 may not be present near the printer 10. That is, for example, in a situation that the printer 10 is located at home and the user goes out carrying the portable terminal 70, the user can register various pieces of information in the print intermediation server 100 by using the portable terminal 70.

The user of the portable terminal 70 first activates the printer appl. being installed in the portable terminal 70, and performs a registration operation. The registration operation includes selecting a button indicating "registration" on a screen which is displayed in accordance with the printer appl. The CPU 82 of the portable terminal 70 performs each process illustrated in FIG. 2 in accordance with the printer appl. when the registration operation is performed.

The CPU 82 of the portable terminal 70 first obtains the virtual print condition information included in the printer appl., and a proxy ID "aaa" of the portable terminal 70 from the memory 84. Next, the CPU 82 supplies the print intermediation server 100 with a registration request 200 including the virtual print condition information and the proxy ID "aaa" via the wireless LAN I/F 78 (i.e., performs a Wi-Fi communication). Moreover, a URL of the print intermediation server 100, which is a supply destination of the registration request 200, is registered in advance in the printer appl. Below, unless described in particular, the URL of the request supply destination is registered in advance in the printer appl.

When obtaining the registration request 200 from the portable terminal 70, the print intermediation server 100 creates the printer ID "xxx" for identifying a registration target printer by using the proxy ID "aaa" included in the registration request 200. Since the proxy ID "aaa" is the proxy ID of the portable terminal 70 and is not the proxy ID of an actual printer (e.g., the printer 10), the printer ID "xxx" created from the proxy ID "aaa" is not an ID for identifying the actual printer, but can be said to be an ID for identifying a virtual printer.

The print intermediation server 100 associates the printer ID "xxx" of the virtual printer with the virtual print condition information included in the registration request 200 and stores them. In FIG. 2, boxes on the right of the broken line corresponding to the print intermediation server 100 indicate that each piece of information in the boxes is associated with each other. The same also applies for FIG. 3 and subsequent figures.

Next, the print intermediation server 100 supplies to the portable terminal 70 a response 202 including the printer ID "xxx" and a login URL which indicates a location of login screen data 212 described below.

When obtaining the response 202 from the print intermediation server 100 via the wireless LAN I/F 78, the CPU 82 of the portable terminal 70 stores in the memory 84 the printer ID "xxx" included in the response 202 (see FIG. 1). Next, the CPU 82 supplies an access request 210 to the print intermediation server 100 via the wireless LAN I/F 78 with the login URL included in the response 202 as the supply destination.

When obtaining the access request 210 from the portable terminal 70, the print intermediation server 100 supplies the login screen data 212 to the portable terminal 70. The login screen data 212 is data which represents a login screen for inputting account information AC (i.e., a user ID, password etc.).

When obtaining the login screen data 212 from the print intermediation server 100 via the wireless LAN I/F 78, the CPU 82 of the portable terminal 70 displays on the display unit 74 a login screen represented by the login screen data 212. The user inputs, in the portable terminal 70 by using the operation unit 72, the account information AC registered in the print intermediation server 100 upon the above advance preparation. In this case, the CPU 82 supplies a login request 214 including the account information AC to the print intermediation server 100 via the wireless LAN I/F 78.

Moreover, the account information AC is inputted to the portable terminal 70 by the user in the present embodiment. Instead, when for example the above advance preparation is performed by using the portable terminal 70, the memory 84 of the portable terminal 70 may store the account information AC. In this case, the CPU 82 of the portable terminal 70 may obtain the account information AC from the memory 84 without having the user input the account information AC, and supply the login request 214 including the account information AC to the print intermediation server 100.

When obtaining the login request 214 from the portable terminal 70, the print intermediation server 100 performs authentication of the account information AC included in the login request 214. Specifically, the print intermediation server 100 judges whether or not the account information AC included in the login request 214 is already registered in the print intermediation server 100. When judging that the account information AC is not yet registered, that is, when failing to authenticate the account information AC, the print intermediation server 100 supplies a login failure notification to the portable terminal 70 although not illustrated. In this case, the registration process is finished without performing subsequent processes.

When judging that the account information AC is already registered, that is, when succeeding to authenticate the account information AC, the print intermediation server 100 creates the first AT which is a unique token (i.e., character string). Then, the print intermediation server 100 associates the successfully authenticated account information AC, the printer ID "xxx", the virtual print condition information, and the first AT with each other and stores them. Next, the print intermediation server 100 supplies a login success notification 216 including the first AT to the portable terminal 70.

When obtaining the login success notification 216 from the print intermediation server 100 via the wireless LAN I/F 78, the CPU 82 of the portable terminal 70 stores the first AT included in the login success notification 216 in the memory 84 (see FIG. 1). By this means, the registration process is finished.

Figure 3:
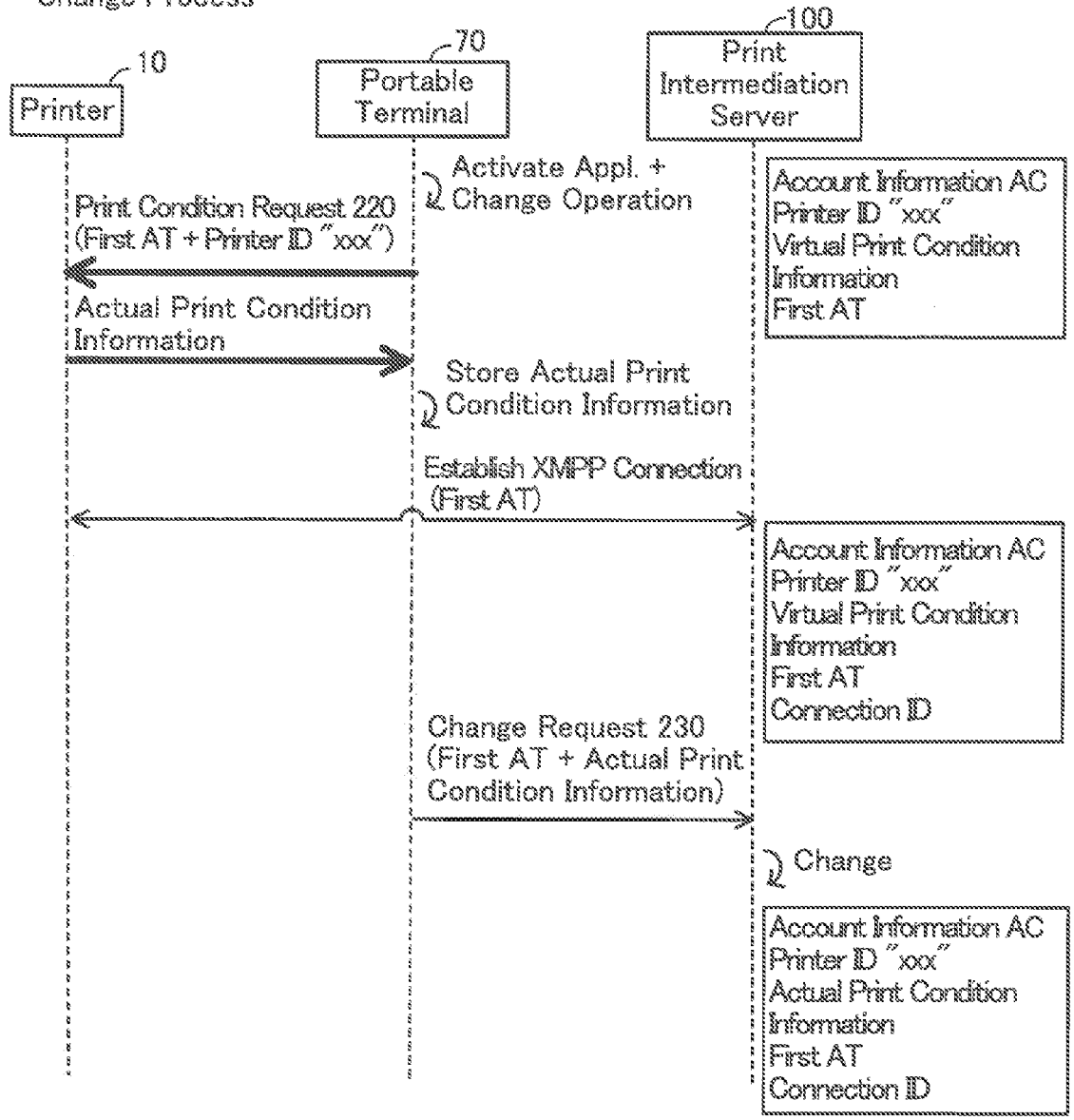
FIG. 3 illustrates a sequence diagram of a change process.

(Change Process; FIG. 3)

Next, a change process for the portable terminal 70 to change the virtual print condition information registered in the print intermediation server 100 into the actual print condition information of the actual printer (in the present embodiment the printer 10) will be described with reference to FIG. 3. The fat arrows and the thin arrows in FIG. 3 respectively indicate NFC communication and Wi-Fi communication. The same also applies for subsequent figures.

When desiring to cause the portable terminal 70 to perform the change process, the user of the portable terminal 70 needs to be present near the printer 10. As described below, this is because the portable terminal 70 and the printer 10 need to perform an NFC communication.

The user of the portable terminal 70 first activates the printer appl., and performs a change operation. The change operation includes selecting a button indicating "change" on the screen displayed in accordance with the printer appl.

When the change operation is performed, the CPU 82 of the portable terminal 70 performs each process illustrated in FIG. 3 in accordance with the printer appl.

The CPU 82 of the portable terminal 70 first controls the display unit 74 to display a message prompting the portable terminal 70 to be placed close to the printer 10. Consequently, the user of the portable terminal 70 places the portable terminal 70 close to the printer 10. When a distance between the NFC I/F 16 of the printer 10 and the NFC I/F 76 of the portable terminal 70 (referred to as "device distance" below) changes from a state of being above a predetermined distance (e.g., 10 cm) to a state of being below or equal to the predetermined distance, a communication link of the NFC scheme (referred to as "NFC link" below) is established between the two NFCs I/F 16, 76.

When the NFC link is established, the CPU 82 of the portable terminal 70 obtains the first AT and the printer ID "xxx" (i.e., the information stored in the registration process of FIG. 2) from the memory 84. Then, by using the NFC link, the CPU 82 sends a print condition request 220 including the first AT and the printer ID "xxx" to the printer 10. The print condition request 220 is a command for requesting the printer 10 to send the actual print condition information. Here, due to performing an NFC communication, the CPU 82 can send the print condition request 220 to the printer 10 without using the IP addresses of the sending destination and sending source, the URLs of the sending destination and sending source, etc. Below, when NFC communication is performed, the IP addresses of the sending destination and sending source, the URLs of the sending destination and sending source, etc. are not used.

When receiving the print condition request 220 from the portable terminal 70 by using the NFC link, the CPU 32 of the printer 10 stores the first AT and the printer ID "xxx" included in the print condition request 220 in the memory 34 (see FIG. 1).

Next, the CPU 32 of the printer 10 obtains the actual print condition information from the memory 34. Then, the CPU 32 sends the actual print condition information to the portable terminal 70 by using the NFC link which is the same as the NFC link for receiving the print condition request 220.

When receiving the actual print condition information from the printer 10 by using the NFC link, the CPU 82 of the portable terminal 70 stores the actual print condition information in the memory 84 (see FIG. 1).

As described above, the print condition request 220 and the actual print condition information are communicated by using the same NFC link. In other words, both the print condition request 220 and the actual print condition information are communicated during a period after the device distance has reached a state equal to or less than the predetermined distance (e.g., 10 cm) from being in a state larger than the predetermined distance, and before the device distance returns to the state larger than the predetermined distance. Consequently, in order to perform the communication of the print condition request 220 and the actual print condition information, the user may perform the single operation of placing the portable terminal 70 close to the printer 10. Consequently, user convenience is high.

When sending of the actual print condition information to the portable terminal 70 has ended, the CPU 32 of the printer 10 controls the display unit 14 to display a message indicating that the NFC communication has ended. By this means, the user of the portable terminal 70 can learn that the NFC communication has ended, and can move the portable terminal 70 away from the printer 10. Consequently, when the device distance reaches a state larger than the predetermined distance, the NFC link is disconnected.

Next, the CPU 32 of the printer 10 establishes an XMPP connection between the printer 10 and the print intermediation server 100 by using the first AT included in the print condition request 220. Specifically, the CPU 32 supplies an XMPP connection request including the first AT to the print intermediation server 100 via the wireless LAN I/F 18 (i.e., performs a Wi-Fi communication).

When obtaining the XMPP connection request from the printer 10, the print intermediation server 100 performs authentication of the first AT included in the XMPP connection request. Then, when succeeding to authenticate the first AT, the print intermediation server 100 creates a connection ID for identifying the XMPP connection, and supplies a response including the connection ID to the printer 10.

The print intermediation server 100 further stores the connection ID in association with the first AT included in the XMPP connection request. By this means, the account information AC, the printer ID "xxx", the virtual print condition information, the first AT, and the connection ID are associated with each other in the print intermediation server 100.

The CPU 32 of the printer 10 obtains the response including the connection ID from the print intermediation server 100 via the wireless LAN I/F 18. Consequently, the XMPP connection between the printer 10 and the print intermediation server 100 is established. By this means, so-called always-on connection is established between the printer 10 and the print intermediation server 100, so that it is possible to supply a submit notification described below (see FIG. 4) from the print intermediation server 100 located on a WAN side to the printer 10 located on a LAN side.

After the actual print condition information has been stored in the memory 84, the CPU 82 of the portable terminal 70 supplies a change request 230 including the first AT and the actual print condition information to the print intermediation server 100 via the wireless LAN I/F 78. The change request 230 is a command for requesting the print intermediation server 100 to change the virtual print condition information being registered in the print intermediation server 100 to the actual print condition information included in the change request 230.

When obtaining the change request 230 from the portable terminal 70, the print intermediation server 100 performs authentication of the first AT included in the change request 230. Then, when succeeding to authenticate the first AT, the print intermediation server 100 stores the actual print condition information included in the change request 230 instead of the virtual print condition information associated with the first AT. By this means, the account information AC, the printer ID "xxx", the actual print condition information, the first AT, and the connection ID are associated with each other in the print intermediation server 100.

As described above, the virtual print condition indicated by the virtual print condition information is different from the actual print condition of the printer 10. Consequently, it may not be possible to cause the printer 10 to properly perform a print using the print intermediation server 100 in the state of the virtual print condition information registered in the print intermediation server 100. This is because the print intermediation server 100 can create print data in accordance with a print setting (e.g., number of colors "color") which the printer 10 cannot perform. In the present embodiment, as illustrated in FIG. 3, the portable terminal 70 can change the virtual print condition information being registered in the print intermediation server 100 to the actual print condition information of the printer 10. By this means, it is possible to cause the printer 10 to properly perform a print using the print intermediation server 100 (see FIG. 4 described below).

Moreover, in the registration process of FIG. 2, the printer ID "xxx" is registered in the print intermediation server 100 as the ID for identifying the virtual printer. Subsequently, in the change process of FIG. 3, the printer ID "xxx" is not itself changed, but the actual print condition information of the printer 10 is registered in the print intermediation server 100 in association with the printer ID "xxx". Consequently, after the change process of FIG. 3, the printer ID "xxx" can be said to be an ID for identifying the printer 10 which is an actual printer.

Figure 4:
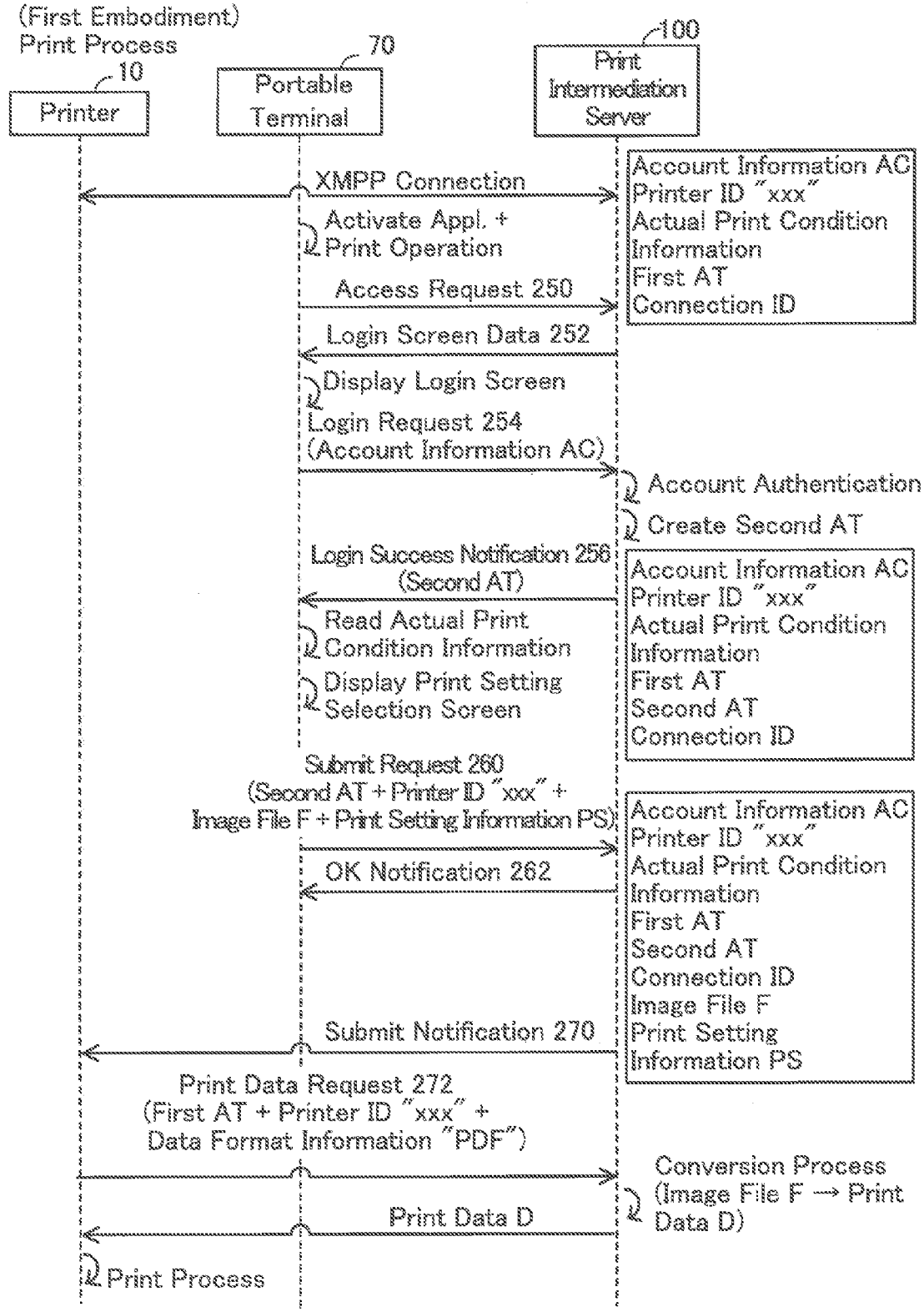
FIG. 4 illustrates a sequence diagram of a print process.

(Print Process; FIG. 4)

Next, a print process in which the portable terminal 70 submits (i.e., registers) an image file which represents an image of a print target to the print intermediation server 100, and causes the printer 10 to perform a print by using the print intermediation server 100 will be described with reference to FIG. 4.

The print process is performed after the change process of FIG. 3. Consequently, the XMPP connection between the printer 10 and the print intermediation server 100 is established, and the account information AC, the printer ID "xxx", the actual print condition information, the first AT, and the connection ID are associated with each other in the print intermediation server 100 (see FIG. 3).

When desiring to cause the portable terminal 70 to perform the print process, the user may not be present near the printer 10. For example, the user can submit to the print intermediation server 100 an image file which represents an image captured by the portable terminal 70 at a visiting place, and cause the printer 10 to perform a print of the image.

The user of the portable terminal 70 first activates the printer appl., and performs a print operation. The print operation includes selecting a button indicating "print" displayed on the screen in accordance with the printer appl., and specifying the image file F in the memory 84 (i.e., the image file F1 representing an image which the user desires to print). When the print operation is performed, the CPU 82 of the portable terminal 70 performs each process of FIG. 4 in accordance with the printer appl.

The CPU 82 of the portable terminal 70 first supplies an access request 250 to the print intermediation server 100 via the wireless LAN I/F 78.

When obtaining the access request 250 from the portable terminal 70, the print intermediation server 100 supplies login screen data 252 to the portable terminal 70.

When obtaining the login screen data 252 from the print intermediation server 100 via the wireless LAN I/F 78, the CPU 82 of the portable terminal 70 controls the display unit 74 to display a login screen represented by the login screen data 252. By using the operation unit 72, the user inputs the account information AC to the portable terminal 70. In this case, the CPU 82 supplies a login request 254 including the account information AC to the print intermediation server 100 via the wireless LAN I/F 78.

When obtaining the login request 254 from the portable terminal 70, the print intermediation server 100 performs authentication of the account information AC included in the login request 254. When succeeding to authenticate the account information AC, the print intermediation server 100 creates a second AT which is a token different from the first AT. Next, the print intermediation server 100 associates the successfully authenticated account information AC with the second AT, and stores them. Consequently, in the print intermediation server 100, the account information AC, the printer ID "xxx", the actual print condition information, the first AT, the second AT, and the connection ID are associated with each other. Then, the print intermediation server 100 supplies a login success notification 256 including the second AT to the portable terminal 70.

When obtaining the login success notification 256 from the print intermediation server 100 via the wireless LAN I/F 78, the CPU 82 of the portable terminal 70 obtains the actual print condition information from the memory 84. Then, the CPU 82 controls the display unit 74 to display a print setting selection screen by using the actual print condition information. The print setting selection screen is a screen for causing the user to select a print setting from the actual print condition indicated by the actual print condition information. As described above, the actual print condition information includes "A4" and "B5" as the sheet size information, and "monochrome print" as the number of colors information. Consequently, the print setting selection screen has a manner which enables a selection of "A4" or "B5" as the sheet size. The user selects the print setting by selecting the sheet size (e.g., "A4") by using the operation unit 72 while looking at the print setting selection screen. The number of colors (i.e., "monochrome print") has no option, and therefore is automatically implemented in the print setting.

When the user selects a print setting, the CPU 82 of the portable terminal 70 creates a submit request 260. The submit request 260 includes the second AT included in the login success notification 256, the printer ID "xxx" in the memory 84, the image file F specified by the user, and print setting information PS indicating the print setting selected by the user. Then, the CPU 82 supplies the submit request 260 to the print intermediation server 100 via the wireless LAN I/F 78.

When obtaining the submit request 260 from the portable terminal 70, the print intermediation server 100 performs authentication of the second AT and the printer ID "xxx" included in the submit request 260. When succeeding to authenticate the second AT and the printer ID "xxx", the print intermediation server 100 associates the image file F and the print setting information PS included in the submit request 260 with the second AT and the printer ID "xxx", and stores them. Consequently, in the print intermediation server 100, the account information AC, the printer ID "xxx", the actual print condition information, the first AT, the second AT, the connection ID, the image file F, and the print setting information PS are associated with each other. Then, the print intermediation server 100 supplies an OK notification 262 indicating that submission succeeded to the portable terminal 70.

The CPU 82 of the portable terminal 70 obtains the OK notification 262 from the print intermediation server 100 via the wireless LAN I/F 78.

The print intermediation server 100 further supplies to the printer 10 a submit notification 270 indicating that the image file F and the print setting information PS were registered. Specifically, the print intermediation server 100 extracts the connection ID associated with the successfully authenticated second AT and the printer ID "xxx" from each piece of information stored in the print intermediation server 100. Then, the print intermediation server 100 supplies the submit notification 270 to the printer 10 by using the XMPP connection identified by the connection ID. By this means, the print intermediation server 100 located on the WAN side can properly supply the submit notification 270 to the printer 10 located on the LAN side.

When obtaining the submit notification 270 from the print intermediation server 100 via the wireless LAN I/F 18 by using the XMPP connection, the CPU 32 of the printer 10 creates a print data request 272. The print data request 272 includes the first AT in the memory 34, the printer ID "xxx" in the memory 34, and data format information indicating data format which can be interpreted by the printer 10. In the present embodiment, the data format is "PDF (abbreviation of Portable Document Format)", but in a modified embodiment the data format may be "PWG-Raster", "XPS (abbreviation of XML Paper Specification)", etc.

Next, the CPU 32 of the printer 10 supplies the print data request 272 to the print intermediation server 100 via the wireless LAN I/F 18. Moreover, the CPU 32 does not supply the print data request 272 by using the XMPP connection, but supplies the print data request 272 in accordance with e.g., HTTP (abbreviation of Hyper Text Transfer Protocol), with the URL of the print intermediation server 100 as the supply destination.

When obtaining the print data request 272 from the printer 10, the print intermediation server 100 performs authentication of the first AT and the printer ID "xxx" included in the print data request 272. When succeeding to authenticate the first AT and the printer ID "xxx", the print intermediation server 100 performs the following conversion process.

That is, in accordance with the data format information "PDF" included in the print data request 272, and the print setting information PS associated with the first AT and the printer ID "xxx", the print intermediation server 100 performs a conversion process on the image file F associated with the first AT and the printer ID "xxx", in order to create print data D. For example, when the print setting information PS indicates that sheet size is "A4" and that the number of colors is "monochrome print", the print intermediation server 100 creates the print data D having the PDF format for performing a print of a monochrome image on A4 print sheets. Next, the print intermediation server 100 supplies the print data D to the printer 10.

When obtaining the print data D from the print intermediation server 100 via the wireless LAN I/F 18, the CPU 32 of the printer 10 supplies the print data D to the print performing unit 20. Consequently, the print performing unit 20 prints an image represented by the print data D onto the print sheet. By this means, the user of the portable terminal 70 can obtain the printed print sheet.

Figure 5:
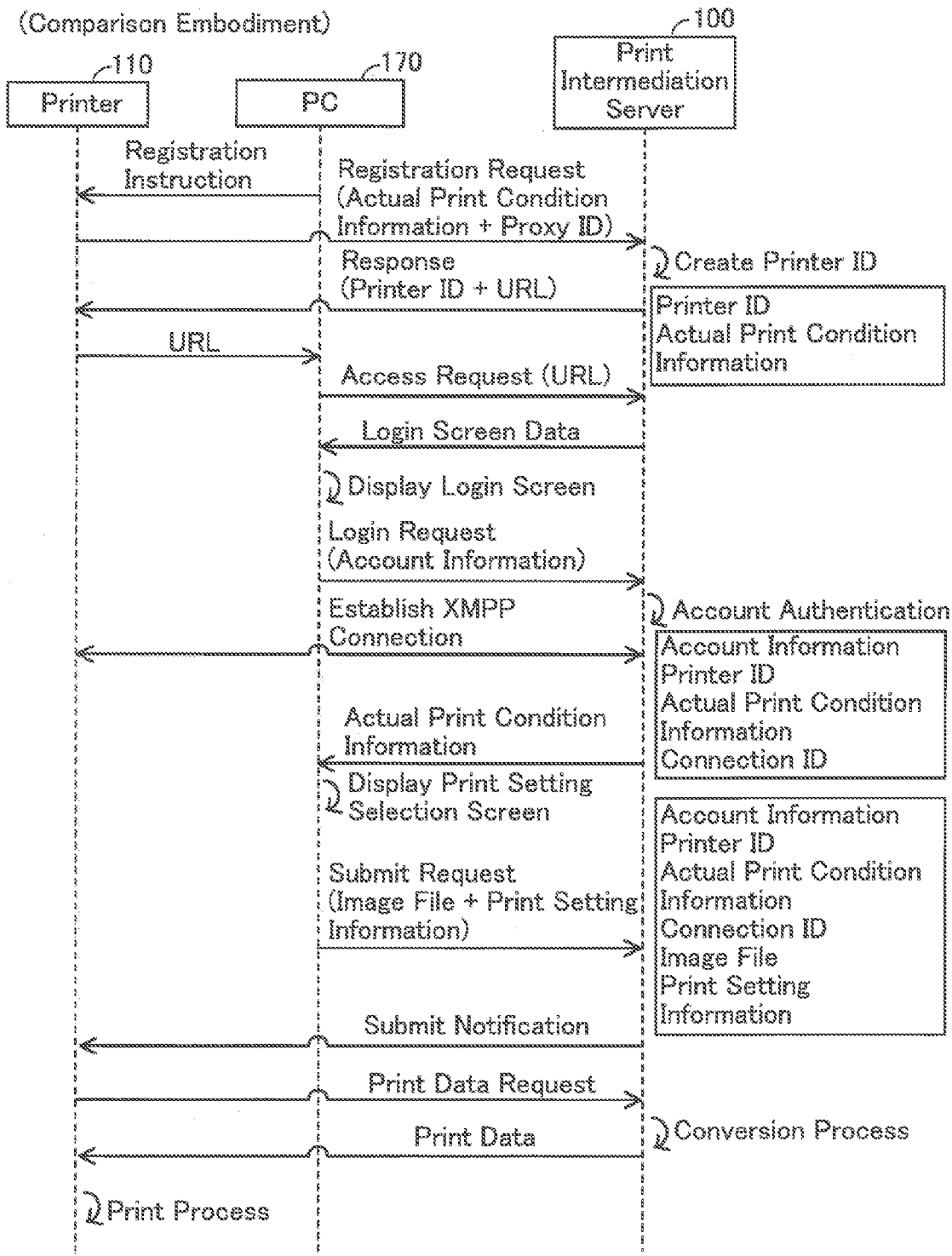
FIG. 5 illustrates a sequence diagram of a comparison embodiment.

(Comparison Embodiment; FIG. 5)

A process according to a comparison embodiment will be described with reference to FIG. 5 before an effect according to the present embodiment will be described. A system according to the comparison embodiment includes a printer 110, a PC 170 and the print intermediation server 100. The printer 110 and the PC 170 can perform a Wi-Fi communication, but cannot perform an NFC communication. Hence, all communications illustrated in FIG. 5 are Wi-Fi communications.

A user of the PC 170 first operates the PC 170 to access a web server function of the printer 110. By this means, the PC 170 accesses the web server function of the printer 110, and sends a registration instruction to the printer 110.

When receiving the registration instruction from the PC 170, the printer 110 supplies to the print intermediation server 100 a registration request including actual print condition information indicating an actual print condition of the printer 110 and a proxy ID of the printer 110.

When obtaining the registration request from the printer 110, the print intermediation server 100 creates printer ID for identifying the printer 110 by using the proxy ID of the printer 110 included in the registration request. Next, the print intermediation server 100 associates the printer ID with the actual print condition information included in the registration request, and stores them. Then, the print intermediation server 100 supplies a response including the printer ID and a login URL to the printer 110.

When receiving the response from the intermediation server 100, the printer 110 sends the login URL included in the response to the PC 170. Further, the printer 110 stores the printer ID included in the response, and performs polling with respect to the print intermediation server 100 although not illustrated. The polling is performed to establish an XMPP connection between the printer 110 and the print intermediation server 100 when the print intermediation server 100 successfully authenticates the account information.

When receiving the login URL from the printer 110, the PC 170 sends an access request to the print intermediation server 100 with the login URL as the supply destination. Consequently, the PC 170 obtains login screen data from the print intermediation server 100 and displays a login screen. Then, the user inputs the account information to the PC 170. In this case, the PC 170 supplies a login request including the account information to the print intermediation server 100.

When obtaining the login request from the PC 170, the print intermediation server 100 performs authentication of the account information, and establishes the XMPP connection between the print intermediation server 100 and the printer 110 in response to the polling from the printer 110 when succeeding to authenticate the account information. Then, the print intermediation server 100 stores the account information and the connection ID for identifying the XMPP connection. By this means, in the print intermediation server 100, the account information, the printer ID, the actual print condition information, and the connection ID are associated with each other.

Next, when a process to submit the image file is performed, the PC 170 obtains the actual print condition information stored in the print intermediation server 100 from the print intermediation server 100. Then, by using the actual print condition information, the PC 170 displays a print setting selection screen. When the print setting is selected by the user, the PC 170 supplies to the print intermediation server 100 a submit request including the image file and the print setting information indicating the print setting.

When obtaining the submit request from the PC 170, the print intermediation server 100 stores the image file and the print setting information. By this means, in the print intermediation server 100, the account information, the printer ID, the actual print condition information, the connection ID, the image file, and the print setting information are associated with each other. Next, the print intermediation server 100 supplies a submit notification to the printer 110 by using the XMPP connection.

When obtaining the submit notification from the print intermediation server 100, the printer 110 sends a print data request to the print intermediation server 100.

When obtaining the print data request from the printer 110, the print intermediation server 100 performs the conversion process on the image file in accordance with the print setting information, in order to create print data. Then, the print intermediation server 100 supplies the print data to the printer 110.

When obtaining the print data from the print intermediation server 100, the printer 110 performs a print of an image represented by the print data.

(Effect of First Embodiment)

As described above, in the comparison embodiment in FIG. 5, the user must access the web server function of the printer 110, cause the printer 110 to perform a communication of the registration request with the print intermediation server 100, and register the actual print condition information of the printer 110 in the print intermediation server 100. Since it is difficult for a user with poor knowledge of the printer 110 to access the web server function of the printer 110, it is difficult for the user to perform the operation for registering the actual print condition information.

In the present embodiment, as illustrated in FIG. 2, a method is employed in which the print condition information of the actual printer is not registered in the print intermediation server 100, but instead the virtual print condition information of the virtual printer is registered in the print intermediation server 100. Therefore, the user of the portable terminal 70 does not need to cause the printer 10 to perform a communication with the print intermediation server 100 in order to register the virtual print condition information in the print intermediation server 100. Consequently, the user 70 does not need to perform the operation for accessing the web server function of the printer 10, and can easily register the virtual print condition information in the print intermediation server 100.

As illustrated in FIG. 3, if the user places the portable terminal 70 near the printer 10, the portable terminal 70 receives the actual print condition information from the printer 10. Then, the portable terminal 70 supplies the change request 230 including the first AT and the actual print condition information to the print intermediation server 100, and registration contents of the print intermediation server 100 can change from the virtual print condition information to the actual print condition information. Consequently, if the user performs the one-touch operation of placing the portable terminal 70 close to the printer 10, the actual print condition information of the printer 10 instead of the virtual print condition information can be registered in the print intermediation server 100. Consequently, user convenience is high.

Further, as illustrated in FIG. 4, the portable terminal 70 displays the print setting selection screen by using the actual print condition information. For this reason, the user can select the desired print setting from the actual print condition of the printer 10 while looking at the print setting selection screen. Then, the portable terminal 70 registers the image file F and the print setting information PS in the print intermediation server 100 in association with the account information AC, the printer ID "xxx", the actual print condition information, etc. Consequently, the user can register the desired image file F and the print setting information PS indicating the desired print setting in the print intermediation server 100. Consequently, the user can obtain a print sheet on which the desired image has been printed in accordance with the desired print setting.

Further, in the comparison embodiment in FIG. 5, when the image file is to be submitted to the print intermediation server 100, the PC 170 obtains the actual print condition information of the printer 110 from the print intermediation server 100, and displays the print setting selection screen. Therefore, in order to submit the image file, a communication of the actual print condition information must be performed between the PC 170 and the print intermediation server 100, and the load on the network between the PC 170 and the print intermediation server 100 is high.

In the present embodiment, as illustrated in FIG. 3, the portable terminal 70 stores the actual print condition information of the printer 10 in the memory 84. Therefore, as illustrated in FIG. 4, when the image file F is to be submitted, the portable terminal 70 can display the print setting selection screen by using the actual print condition information in the memory 84. Consequently, since the portable terminal 70 does not need to obtain the actual print condition information from the print intermediation server 100, the communication of the actual print condition information does not need to be performed between the portable terminal 70 and the print intermediation server 100 in order to submit the image file F. Therefore, the load on the network between the portable terminal 70 and the print intermediation server 100 can be reduced.

(Correspondence Relationship)

The virtual print condition information and the actual print condition information of the printer 10 are examples of "printer related information" and "print condition related information", respectively. The first AT is an example of "authentication information". The image file F is an example of "target file" and "file related information". The print setting selection screen is an example of "selection screen". The XMPP connection and the submit notification 270 are examples of "specific connection" and "notification", respectively. The NFC scheme and Wi-Fi scheme are examples of "short distance communication scheme" and "predetermined communication scheme", respectively.

(Second Embodiment FIG. 6)

Although the registration process is performed by using the method of OAuth in the first embodiment (see FIG. 2), the registration process using the method of Client Login is performed in the present embodiment.

As illustrated in FIG. 6, when a registration operation is performed, the CPU 82 of the portable terminal 70 controls the display unit 74 to display a login screen registered in advance in the printer appl. The user inputs the account information AC to the portable terminal 70 by using the operation unit 72. In this case, the CPU 82 supplies a login request 214 including the account information AC to the print intermediation server 100 via the wireless LAN I/F 78.

When obtaining the login request 214 from the portable terminal 70, the print intermediation server 100 performs authentication of the account information AC included in the login request 214, and creates the first AT when succeeding to authenticate the account information AC. Next, the print intermediation server 100 associates the successfully authenticated account information AC with the first AT, and stores them. The print intermediation server 100 supplies a login success notification 216 including the first AT to the portable terminal 70.

When obtaining the login success notification 216 from the print intermediation server 100 via the wireless LAN I/F 78, the CPU 82 of the portable terminal 70 stores in the memory 84 the first AT included in the login success notification 216. Next, the CPU 82 supplies a registration request 200 including the virtual print condition information and a proxy ID "aaa" to the print intermediation server 100 via the wireless LAN I/F 78.

When obtaining the registration request 200 from the portable terminal 70, the print intermediation server 100 creates a printer ID "xxx" by using the proxy ID "aaa" included in the registration request 200. Then, the print intermediation server 100 stores the printer ID "xxx" and the virtual print condition information. As a result, in the print intermediation server 100, the account information AC, the printer ID "xxx", the virtual print condition information, and the first AT are associated with each other. Then, the print intermediation server 100 supplies a registration success notification 201 including the printer ID "xxx" to the portable terminal 70.

When obtaining the registration success notification 201 from the print intermediation server 100 via the wireless LAN I/F 78, the CPU 82 of the portable terminal 70 stores in the memory 84 the printer ID "xxx" included in the registration success notification 201. By this means, the registration process is finished. The change process and the print process are the same as those in the first embodiment (see FIG. 3, FIG. 4).

Also in the present embodiment, the portable terminal 70 can register the virtual print condition information, the printer ID "xxx" and the like in the print intermediation server 100, and can provide the same effect as that of the first embodiment. In the present embodiment also, the first AT is an example of "authentication information".

(Third Embodiment)

As illustrated in FIG. 3, in the change process of the first embodiment, the print condition request 220 includes the first AT and the printer ID "xxx", whereas in the change process of the present embodiment, the print condition request 220 does not include the first AT and the printer ID "xxx". Consequently, since the first AT is not received from the portable terminal 70, the printer 10 does not establish an XMPP connection with the print intermediation server 100 by using the first AT. Other points are the same as those of the change process of the first embodiment.

(Print Process; FIG. 7)

In the present embodiment, further, the contents of the print process are different from the first embodiment. As illustrated in FIG. 7, an XMPP connection is not established between the printer 10 and the print intermediation server 100. Consequently, in the print intermediation server 100, the account information AC, the printer ID "xxx", the actual print condition information, and the first AT are associated with each other, but the connection ID is not associated.

In the present embodiment, when desiring to cause the printer 10 to perform a print, the user of the portable terminal 70 needs to be present near the printer 10. As described below, this is because the portable terminal 70 and the printer 10 need to perform an NFC communication.

After the print operation has been performed in the portable terminal 70, the communication of each piece of information 250, 252, 254, 256, 260, 262 between the portable terminal 70 and the print intermediation server 100 is the same as in the first embodiment (see FIG. 4).

When obtaining the submit request 260 from the printer 10, the print intermediation server 100 stores the image file F and the print setting information PS, but does not supply a submit notification to the printer 10. This is because a submit notification cannot be supplied to the printer 10 because an XMPP connection is not established between the printer 10 and the print intermediation server 100.

When obtaining the OK notification 262 from the print intermediation server 100 via the wireless LAN I/F 78, the CPU 82 of the portable terminal 70 controls the display unit 74 to display a message prompting the portable terminal 70 to be placed close to the printer 10. Consequently, the user of the portable terminal 70 places the portable terminal 70 close to the printer 10. By this means, the device distance changes from a state of being larger than the predetermined distance (e.g., 10 cm) to a state of being less than or equal to the predetermined distance. Consequently, an NFC link between the two NFC I/Fs 16, 76 is established.

When the NFC link is established, the CPU 82 of the portable terminal 70 obtains the first AT and the printer ID "xxx" from the memory 84. Then, the CPU 82 sends a print instruction 300 including the first AT and the printer ID "xxx" to the printer 10 by using the NFC link.

When receiving the print instruction 300 from the portable terminal 70 by using the NFC link, the CPU 32 of the printer 10 controls the display unit 14 to display a message indicating that the NFC communication has ended. By this means, the user of the portable terminal 70 moves the portable terminal 70 away from the printer 10, and consequently the NFC link is disconnected.

Next, the CPU 32 of the printer 10 supplies a print data request 302 to the print intermediation server 100 in accordance with the print instruction 300. The print data request 302 includes the first AT included in the print instruction 300, the printer ID "xxx" included in the print instruction 300, and the data format information "PDF".

The subsequent point of the print intermediation server 100 performing the conversion process and supplying the print data D to the printer 10, and the point of the printer 10 performing a print by using the print data D are the same as in the first embodiment.

(Effect of Third Embodiment)

In the present embodiment also, as in the first embodiment, the user of the portable terminal 70 does not need to cause the printer 10 to perform a communication with the print intermediation server 100 in order to register the virtual print condition information in the print intermediation server 100. Then, if the user performs the one-touch operation of placing the portable terminal 70 close to the printer 10, the actual print condition information of the printer 10 can be registered in the print intermediation server 100. Consequently, user convenience is high.

Further, in the present embodiment, as illustrated in FIG. 7, the portable terminal 70 performs the NFC communication to send the print instruction 300 including the first AT and the printer ID "xxx" to the printer 10. Consequently, the printer 10 can supply the print data request 302 including the first AT and the printer ID "xxx" to the print intermediation server 100, obtain the print data D from the print intermediation server 100, and perform a print. Thus, a configuration is adopted in which the print instruction 300 is sent to the printer 10 from the portable terminal 70 instead of a configuration in which a submit notification is sent to the printer 10 from the print intermediation server 100, and consequently an XMPP connection between the printer 10 and the print intermediation server 100 does not need to be established. Therefore, the load on the network between the printer 10 and the print intermediation server 100 can be reduced.

(Modified Embodiment 1)

The vendor of the printer 10 may install an information providing server on the Internet. For each of a plurality of types of printer sold by the vendor, the information providing server associates a model name of the printer with the actual print condition information of the printer, and stores them. In the change process of FIG. 3, the portable terminal 70 receives the actual print condition information from the printer 10, however, instead, the portable terminal 70 may receive the model name of the printer 10 from the printer 10. In this case, the portable terminal 70 supplies the model name of the printer 10 to the information providing server, and obtains the actual print condition information of the printer 10 from the information providing server. Then, the portable terminal 70 supplies the change request 230 including the actual print condition information to the print intermediation server 100. In this modified embodiment, the model name of the printer 10 is an example of "print condition related information".

(Modified Embodiment 2)

The printer application may include, for each of the plurality of types of printer, information in which the model name of the printer is associated with the actual print condition information of the printer. Then, as in the modified embodiment 1 described above, the portable terminal 70 may receive the model name of the printer 10 from the printer 10. In this case, the portable terminal 70 obtains the actual print condition information of the printer 10 associated with the model name of the printer 10 from the printer application, and supplies the change request 230 including the actual print condition information to the print intermediation server 100. In this modified embodiment, the model name of the printer 10 is an example of "print condition related information".

(Modified Embodiment 3)

In the change process of FIG. 3, the portable terminal 70 may not store the actual print condition information of the printer 10 in the memory 84. In this case, in the print process of FIG. 4, the portable terminal 70 may obtain the actual print condition information of the printer 10 from the print intermediation server 100, and display the print setting selection screen. Generally speaking, the "controlling a display unit to display a selection screen" may be performed by using actual print condition information.

(Modified Embodiment 4)

In the print process of FIG. 4, the user registers the image file F and the print setting information PS in the print intermediation server 100 by using the portable terminal 70. Instead, the portable terminal 70 may supply the printer ID "xxx" to a specific device (e.g., PC). Then, as with the portable terminal 70 of FIG. 4, the specific device may register the image file F and the print setting information PS in the print intermediation server 100 by using the printer ID "xxx". Generally speaking, file related information and print setting information to be registered in a print intermediation server may be registered by a terminal device, or may be registered by a device different from the terminal device. That is, "controlling a display unit to display a selection screen" and "registering . . . file related information . . . and print setting information" can be omitted.

(Modified Embodiment 5)

In the print process of FIG. 4, the portable terminal 70 supplies the submit request 260 including the image file F to the print intermediation server 100. Instead, when e.g., the image file F is stored on a data server on the Internet, the portable terminal 70 may supply the submit request 260 including a URL of the image file F to the print intermediation server 100. In this case, the print intermediation server 100 stores the URL of the image file F. Then, when obtaining the print data request 272 from the printer 10, the print intermediation server 100 may obtain the image file F from the data server by using the URL of the image file F, convert the image file F, and create the print data D. In this modified embodiment, the URL of the image file F is an example of "file related information".

(Modified Embodiment 6)

The first AT created in the registration process in FIG. 2 is registered in the print intermediation server 100 in a situation that the change process in FIG. 3 is performed. In this regard, when the change process in FIG. 3 is performed, an expiration period of the first AT may end. Hence, in the registration process in FIG. 2, the print intermediation server 100 may create not only the first AT but also a so-called refresh token, and associate the refresh token with the account information AC and the like and store the refresh token. In this case, the print intermediation server 100 can create a new token by using the refresh token when the expiration period of the first AT ends, and store the new token instead of the first AT. Then, the portable terminal 70 receives the login success notification 216 including not only the first AT but also the refresh token from the print intermediation server 100. In the change process in FIG. 3, the portable terminal 70 creates a new token by using the refresh token, and supplies the change request 230 including the new token to the print intermediation server 100 when the expiration period of the first AT ends. In this modified embodiment, the first AT and refresh token is an example of "authentication information".

(Modified Embodiment 7)

In the registration process of FIG. 2, the print intermediation server 100 creates and stores both the first AT and the printer ID "xxx". By this means, by using the first AT and the printer ID "xxx", the portable terminal 70 and the printer 10 can perform each process of establishing the XMPP connection (see FIG. 3), supplying the change request 230 (see FIG. 3), supplying the submit request 260 (see FIG. 4), supplying the print data request 272 (FIG. 4), and the like. Instead, the print intermediation server 100 may create the first AT without creating the printer ID. In this case, the portable terminal 70 and the printer 10 may perform each process above by using the first AT, without using the printer ID. In this modified embodiment, the first AT is an example of "authentication information". Further, in another modified embodiment, the print intermediation server 100 may not create the first AT, but may create the printer ID "xxx". In this case, the portable terminal 70 and the printer 10 may perform each process above by using the printer ID "xxx", without using the first AT. In this modified embodiment, the printer ID "xxx" is an example of "authentication information". That is, "authentication information" may be any information used to perform authentication in the print intermediation server.

(Modified Embodiment 8)

In each of the above embodiments, the "printer related information" registered in the print intermediation server includes only print condition information (i.e., the virtual print condition information or the actual print condition information of the printer 10). In this regard, the "printer related information" may include not only the print condition information, but also other information such as information indicating printer name of the printer, information indicating a printer default setting, information indicating status of the printer, and the like.

(Modified Embodiment 9)

The printer 10 and the portable terminal 70 may perform a communication of the print condition request 220 and the actual print condition information by performing a short distance wireless communication of another communication scheme (e.g., a wireless communication in accordance with a transfer jet scheme, an infrared scheme or the like) instead of performing a wireless communication in accordance with an NFC scheme. In this modified embodiment, the another communication scheme is an example of "short distance communication scheme". Further, the printer 10 and the portable terminal 70 may perform a communication of the print condition request 220 or the like by performing a wireless communication in accordance with the Wi-Fi scheme instead of performing a short distance wireless communication. Furthermore, the printer 10 and the portable terminal 70 may perform a communication of the print condition request 220 or the like by performing a wired communication instead of performing a wireless communication. Generally speaking, the communication may be any communication by which the terminal device and the printer can communicate.

(Modified Embodiment 10)

The portable terminal 70 may perform a wireless communication in accordance with a cellular scheme such as 3G or 4G and perform a communication with the print intermediation server 100 instead of performing a wireless communication in accordance with the Wi-Fi scheme and performing a communication of various pieces of information (e.g., the registration request 200 in FIG. 2) with the print intermediate server 100. In this modified embodiment, the cellular scheme is an example of "predetermined communication scheme". Further, the portable terminal 70 may perform a communication with the print intermediation server 100 by performing a wired communication when the portable terminal 70 is connected to the Internet with a wired connection. Generally speaking, the communication may be any communication by which the terminal device and the printer can communicate.

(Modified Embodiment 11)

The printer 10 may perform a wired communication with the print intermediation server 100 of various pieces of information (e.g., the establishment of the XMPP connection in FIG. 3) when the printer 10 is connected to the Internet with a wired connection. Generally speaking, the communication may be any communication by which the printer and the print intermediation server can communicate.

(Modified Embodiment 12)

The print intermediation server 100 may not be one server and may be a plurality of servers which are configured separately. For example, the print intermediation server 100 may have a first server which performs each process in FIG. 2 and FIG. 3, and a second server (i.e. a second server which is configured separately from the first server) which performs each process illustrated by the print process in FIG. 4.

(Modified Embodiment 13)

"Terminal device" may not be the portable terminal 70 and may be a desktop PC or another device (e.g., a television).

(Modified Embodiment 14)

In each of the above embodiments, the CPU 32 of the printer 10 and the CPU 82 of the portable terminal 70 perform a program in the memories 34 and 84 to implement each process in FIGS. 2 to 4. Instead, at least one process of each process in FIGS. 2 to 4 may be implemented by hardware such as a logic circuit.

What is claimed is:

1. A terminal device comprising:
a processor; and
a memory storing computer-readable instructions therein, the computer-readable instructions, when executed by the processor, causing the terminal device to perform:
obtaining virtual print condition information included in an application installed in the terminal device, the virtual print condition information indicating a virtual print condition, the virtual print condition being a print condition that is used virtually in a virtual printer;
registering printer related information in a print intermediation server by supplying the obtained virtual print condition information to the print intermediation server, the printer related information including the obtained virtual print condition information;
obtaining authentication information from the print intermediation server, the authentication information being registered in the print intermediation server in association with the printer related information;
receiving print condition related information from an actual printer after the printer related information was registered in the print intermediation server, the print condition related information being related to an actual print condition, the actual print condition being a print condition that is used in the actual printer;
changing, by using the authentication information and the print condition related information, contents of the printer related information being registered in the print intermediation server, from a state including the virtual print condition information to a state including actual print condition information indicating the actual print condition;

controlling a display unit to display a selection screen by using the actual print condition information after changing the contents of the printer related information, the selection screen causing a selection of a print setting from among the actual print condition; and registering, in the print intermediation server, file related information relating to a target file representing an image of a print target and print setting information indicating the selected print setting, in association with the printer related information and the authentication information.

2. The terminal device as in claim 1, wherein
the virtual print condition includes a print condition that is not included in the actual print condition.

3. The terminal device as in claim 1, wherein the computer-readable instructions, when executed by the processor, cause the terminal device to further perform:

sending the authentication information to the actual printer, the authentication information being used by the actual printer to establish a specific connection between the actual printer and the print intermediation server, the specific connection being used to supply a notification from the print intermediation server to the actual printer, the notification indicating that the file related information and the print setting information were registered in the print intermediation server.

4. The terminal device as in claim 3, wherein
the receiving of the print condition related information is performed in response to the sending of the authentication information.

5. The terminal device as in claim 1, wherein
the receiving of the print condition related information is performed without using position information indicating a position of the actual printer.

6. The terminal device as in claim 1, wherein the registering of the printer related information is performed by a wireless communication in accordance with a predetermined communication scheme, the obtaining of the authentication information is performed by the wireless communication in accordance with the predetermined communication scheme, the receiving of the print condition related information is performed by the wireless communication in accordance with a short distance communication scheme, the short distance communication scheme being for a shorter wireless communication than the predetermined communication scheme, and the changing of the contents of the printer related information is performed by the wireless communication in accordance with the predetermined communication scheme.

7. A printer comprising:
a print performing unit;
a processor; and
a memory storing computer-readable instructions therein, the computer-readable instructions, when executed by the processor, causing the printer to perform:

receiving authentication information from a terminal device after the authentication information and printer related information were registered in association in a print intermediation server by the terminal device, the printer related information including virtual print condition information indicating a virtual print condition, the virtual print condition being a print condition that is used virtually in a virtual printer, the printer related information being registered in the print intermediation server by the terminal device supplying, to the print intermediation server, the virtual print condition information included in an application installed in the terminal device;

establishing a specific connection with the print intermediation server by using the authentication information after the printer related information is registered in the print intermediation server;

sending, to the terminal device, print condition related information related to an actual print condition, the actual print condition being a print condition that is used actually in the printer, the print condition related information being used by the terminal device to change contents of the printer related information being registered in the print intermediation server from a state including the virtual print condition information to a state including actual print condition information indicating the actual print condition;

obtaining, from the print intermediation server by using the specific connection, a notification indicating that file related information and print setting information were registered in the print intermediation server, in a case where the file related information and the print setting information are registered in the print intermediation server in association with the authentication information and the printer related information by the terminal device, the file related information being related to a target file that represents an image of a print target, the print setting information indicating a print setting selected from among the actual print condition by a user of the terminal device;

obtaining, from the print intermediation server, print data created from the target file in accordance with the print setting in a case where the notification is obtained; and controlling the print performing unit to perform a print by using the print data.

8. The printer as in claim 7, wherein the receiving of the authentication information is performed by a wireless communication in accordance with a short distance communication scheme, the short distance communication scheme being for a shorter wireless communication than a predetermined communication scheme, the establishing of the specific connection is performed by the wireless communication in accordance with the predetermined communication scheme, the sending of the print condition related information is performed by the wireless communication in accordance with the short distance communication scheme, the obtaining of the notification is performed by the wireless communication in accordance with the predetermined communication scheme, and the obtaining of the print data is performed by the wireless communication in accordance with the predetermined communication scheme.

9. A non-transitory computer-readable medium storing computer-readable instructions for a terminal device, wherein the computer-readable instructions, when executed by a processor mounted on the terminal device, cause the terminal device to perform:

obtaining virtual print condition information included in an application installed in the terminal device, the virtual print condition information indicating a virtual print condition, the virtual print condition being a print condition that is used virtually in a virtual printer;

registering printer related information in a print intermediation server by supplying the obtained virtual print condition information to the print intermediation server, the printer related information including the obtained virtual print condition information;

obtaining authentication information from the print intermediation server, the authentication information being registered in the print intermediation server in association with the printer related information;

receiving print condition related information from an actual printer after the printer related information was registered in the print intermediation server, the print condition related information being related to an actual print condition, the actual print condition being a print condition that is used in the actual printer; and changing, by using the authentication information and the print condition related information, contents of the printer related information being registered in the print intermediation server, from a state including the virtual print condition information to a state including actual print condition information indicating the actual print condition.

\* \* \* \* \*